(12) United States Patent
Iraschko

(10) Patent No.: US 7,926,626 B2
(45) Date of Patent: Apr. 19, 2011

(54) ADJUSTING DEVICE FOR A PNEUMATIC DISC BRAKE

(75) Inventor: Johann Iraschko, Schweitenkirchen (DE)

(73) Assignee: KNORR-BREMSE Systeme fuer Nutzfahzeuge GmbH, Munich (DE)

( * ) Notice: Subject to any disclaimer, the term of this patent is extended or adjusted under 35 U.S.C. 154(b) by 832 days.

(21) Appl. No.: 11/700,786

(22) Filed: Feb. 1, 2007

(65) Prior Publication Data
US 2007/0209890 A1    Sep. 13, 2007

Related U.S. Application Data

(63) Continuation of application No. PCT/EP2005/008403, filed on Aug. 3, 2005.

(30) Foreign Application Priority Data

Aug. 4, 2004  (DE) .......................... 10 2004 037 771

(51) Int. Cl.
*F16D 55/08*  (2006.01)
(52) U.S. Cl. .................... 188/72.7; 188/71.8; 188/196 F
(58) Field of Classification Search .............. 188/196 R, 188/196 V, 196 F, 196 P, 214, 203, 71.7, 71.8, 188/71.9
See application file for complete search history.

(56) References Cited

U.S. PATENT DOCUMENTS

| 4,284,176 A * | 8/1981 | Haraikawa et al. .......... 188/71.7 |
| 4,399,894 A * | 8/1983 | Tribe ........................... 188/71.9 |
| 4,429,768 A | 2/1984 | Margetts et al. |
| 5,353,896 A | 10/1994 | Baumgartner et al. |
| 5,443,141 A | 8/1995 | Thiel et al. |
| 5,819,884 A * | 10/1998 | Giering ........................ 188/71.9 |
| 6,213,255 B1 * | 4/2001 | Neuwirth ..................... 188/71.9 |
| 6,571,921 B2 * | 6/2003 | Ohtani et al. ................. 188/72.1 |
| 7,143,888 B2 * | 12/2006 | Lang .......................... 192/223.3 |
| 7,484,602 B2 * | 2/2009 | Iraschko et al. ........ 188/196 BA |
| 2005/0034935 A1 * | 2/2005 | Maehara ...................... 188/71.9 |
| 2008/0217125 A1 * | 9/2008 | Iraschko ................ 188/196 BA |

FOREIGN PATENT DOCUMENTS

| DE | 40 34 165 A1 | 12/1991 |
| DE | 197 29 024 C1 | 1/1999 |
| EP | 0 614 025 A1 | 9/1994 |
| GB | 2 332 027 A | 6/1999 |

OTHER PUBLICATIONS

International Preliminary Report on Patentability (Chapter I).

* cited by examiner

*Primary Examiner* — Bradley T King
*Assistant Examiner* — Thomas Irvin
(74) *Attorney, Agent, or Firm* — Crowell & Moring LLP

(57) ABSTRACT

An adjusting device for adjusting the wear of the friction surface on the brake lining and brake disc of a pneumatic disc brake having a clamping device that is actuated by a rotary lever is provided. The device preferably can be inserted into a rotary spindle of the disc brake. An anti-friction body is positioned on both axial sides of a drive element, with the one bodies being a ramp coupling with a freewheeling function. The ramp coupling has coupling bushes and clamping balls, and the coupling bush on the driven side being supported on a spring sleeve. A conical seat is configured between the coupling bush and the sprung sleeve cooperates with the ramp coupling to preclude locking of the coupling bushes.

8 Claims, 1 Drawing Sheet

ADJUSTING DEVICE FOR A PNEUMATIC DISC BRAKE

This application is a Continuation of PCT/EP2005/008403, filed Aug. 3, 2005, and claims the priority of DE 10 2004 037 771.5, filed Aug. 4, 2004, the disclosures of which are expressly incorporated by reference herein.

BACKGROUND AND SUMMARY OF THE INVENTION

The invention relates to an adjusting device for a pneumatically actuated disk brake.

A first adjusting device is known from German patent publication DE 40 34 165, reference being made to the full contents of this document. In particular, the adjusting device of the invention is likewise suitable for a disk brake which is actuated by compressed air, in particular in a sliding caliper design, as is shown in this document. Moreover, they can also be used, however, in fixed caliper or pivoting caliper disk brakes which are actuated by compressed air.

Pneumatically actuated disk brakes of this type now belong to the standard equipment of heavy commercial vehicles, where they replace the previously customary drum brakes more and more.

Disk brakes of this type require a mechanical transmission means in order to generate the required brake application of force, as the force of the pneumatically loaded brake cylinders is limited on account of the pressure level (currently approximately 10 bar) and the limited overall size of the brake cylinders. In the pneumatically actuated disk brakes which are known at present, transmission ratios are found between 10:1 and 20:1 which are realized by means of an eccentrically mounted rotary lever in the generic prior art.

The piston strokes of the brake cylinders are between 50 and 75 mm, and this results in brake application paths for pressing the brake linings against the brake disk of approximately 4 mm.

The friction material thickness of the brake linings lies in the region of 20 mm. As two linings are installed, the result is therefore a wear travel of approximately 40 mm, without taking the disk wear into consideration. This travel is greater by a multiple than the abovementioned brake application travel. There is therefore necessity to adjust the brake by means of a device, in a manner which corresponds to the lining wear.

German patent publication DE 40 34 165 A1 achieves this by means of an automatically operating wear adjusting means having a freewheel and an overload coupling (see, for example, FIG. 5 of that document). This achieves a situation where what is known as the air play (this means the gap between the brake linings and the brake disk in the non-actuated state) is kept constant independently of the wear state and wear behavior of the brake linings.

Furthermore, the DE 40 34 165 A1 publication proposes to arrange the adjusting device concentrically in the hollow space of a threaded ram (a threaded spindle) and to drive it from the brake lever eccentrically via a drive element (switching finger).

During braking, the brake lever which is coupled to the piston rod of the brake cylinder performs a rotary movement. Before the rotary movement of the rotary lever is introduced into the adjusting device via the coupling mechanism of the adjusting means (for example, switching fork and switching finger), what is known as an idle travel has to be overcome. This travel is critical for the magnitude of the air play, as the adjusting means is not activated during this movement and the travel of the pressure pistons therefore represents the air play. After this idle travel is overcome, the adjusting device is set into a rotary movement and an adjusting process is initiated by the coupling to the threaded tube.

However, this is only the case when the air play is too great. If the air play has the correct size, the brake linings come into contact with the brake disk at the same time as the switching fingers come into contact with the switching fork of the adjusting device, and a rotation of the threaded tube is no longer possible on account of the high frictional force which is caused by this in the thread.

Nevertheless, the brake lever is rotated further, as a result of the deformation of the component (linings, caliper, mechanical means) which is situated in the force flow, and a rotary movement is also initiated at the adjusting device, furthermore, on account of the direct coupling of the switching fork to the brake lever.

In order that the adjusting device is not damaged, it has to be equipped with what is known as the overload coupling. In the case of the generic prior art (FIG. 5 of the generic document), this is ensured by a ball ramp coupling which unlatches if a defined torque is exceeded.

A further basic component of the adjusting device is the directional coupling, what is known as a clamping roller freewheel in the case of the adjusting device which is described in the above text. This freewheel achieves a situation where the adjusting device can be rotated by the brake lever only in the brake application direction.

During a lining change, the wear adjusting means has to be rotated back into the initial position again. During resetting, the adjusting device has to be rotated counter to the locking direction of the freewheel, which is made possible by the overload coupling which unlatches at a defined torque. An unlimited return rotational angle is possible as a result of the "overrolling function".

In addition to other components, the adjusting device which has been described in the above text therefore necessarily has a clamping roller freewheel and an overload coupling. In order to function reliably, the clamping roller freewheel requires a very accurately manufactured mating running face and a precisely manufactured press fit.

It has therefore been proposed in generic German patent document DE 197 29 024 C1 to combine the unidirectional rotational coupling and the overload coupling to form a combined unidirectional rotary and overload coupling system. Nevertheless, there is also a requirement for a further reduction in the manufacturing costs of this solution.

Against this background, it is the object of the invention to develop the generic adjusting device in such a way that it can be manufactured with as few components as possible and inexpensively with a low processing expenditure. In addition, optimization of the function and service life is preferably also aimed for.

A basic principle of the adjusting device is again a combination of the freewheel and the overload coupling in one functional unit which is configured here, however, to be particularly inexpensive, robust and functionally reliable, in particular by means of a conical seat as an inexpensive failsafe functional element.

Other objects, advantages and novel features of the present invention will become apparent from the following detailed

DETAILED DESCRIPTION

Figure 1:
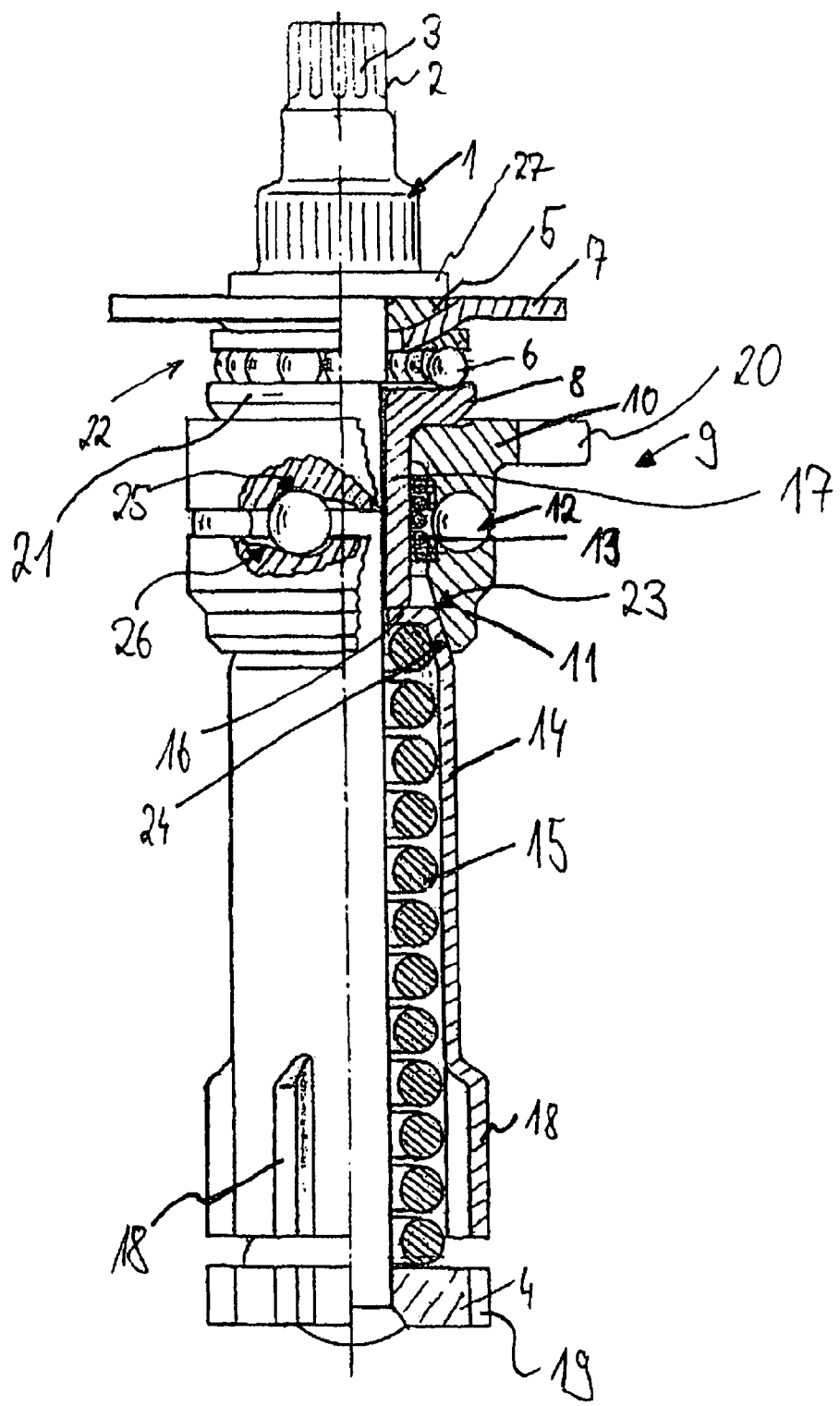
FIG. 1 shows a section through an adjusting device according to an embodiment of the invention.

FIG. 1 shows an adjusting device which, like the adjusting devices of German patent document DE 197 29 024 C1, can be introduced into a surrounding hollow rotary spindle, relative to which it can be displaced axially but cannot be rotated.

The adjusting device has a central spindle 1 which serves as an axle and extends over the entire length of the adjusting device. Said spindle 1 ends, in its region which protrudes outward out of the rotary spindle and the brake caliper, in a drive journal 2 having a profiling 3, which drive journal 2 allows the spindle 1 to be rotated back during a lining change, in order to reset the rotary spindle for a lining change by the amount of wear of the brake linings.

A star-shaped driver 4 is arranged at the opposite end of the spindle 1, which star-shaped driver 4 is designed for engaging into an axially extending internal profiling (at least one groove) of the surrounding rotary spindle (not shown here), with the result that, during revolutions of the spindle 1 and the star-shaped driver 4 which is fastened to the latter, the surrounding internally hollow rotary spindle which is screwed into a further element such as a bridge is also rotated, with the result that it moves axially parallel to the brake disk axis and advances a brake lining axially in the direction of the brake disk for adjusting brake lining wear.

The drive journal 2 is adjoined by a collar 27 of the spindle, on which a bearing bush 5 is supported which is shaped concavely on its side which faces away from the collar 27 and carries a cardanic bearing plate 7.

The bearing plate serves as one bearing bush of a first roller bearing arrangement 22, of a roller bearing, in particular a ball bearing, having bearing elements, in particular balls 6, the opposing bearing bush of which is configured as a spacer sleeve 8 having a collar 21 and a cylindrical projection 17 with a relatively smaller diameter with respect to the collar 21.

By way of its projection 17, the spacer sleeve 8 reaches through a further roller bearing arrangement, a combined freewheel and overload coupling device 9 which has two coupling bushes 10, 11 which serve as coupling bushes of a ball ramp coupling having bearing elements, in particular having balls 12, a torsion spring 13 being seated here between the two coupling bushes 10, 11 and connecting the latter, concentrically on the inside with respect to the ball ramp coupling and the balls and concentrically on the outside with respect to a cylindrical projection 17 of the spacer sleeve 8.

The drive-side coupling bush 10 carries a drive projection 20, for example in the manner of a switching fork, in which, for example, a projection of the rotary lever of the disk brake acts, in order to realize a drive of the adjusting device during brake operations.

In contrast, the output-side coupling bush 11 is supported via an internal conical seat 23 on an external cone 24 of a spring sleeve 14 which accommodates a prestressing spring 15 which is supported with one end on the star-shaped driver 4 and with its other end in an axial end region 16 of the spring sleeve 14.

The freewheel function and the overload coupling are thus combined in a manner which is optimized in terms of installation space, the complete function of the freewheel and the overload coupling being preserved satisfactorily, however.

In its region which faces the star-shaped driver, the spring sleeve 14 has an external profiling 18 which is shaped like the external profiling 19 of the star-shaped driver 4 and likewise engages in the inner grooves of the surrounding rotary spindle.

In the following text, the function of this adjusting device will be described in greater detail.

The prestressed pre-stressing spring 15 presses the spring sleeve 14 with its end side against the spacer sleeve 8.

The length of the spacer sleeve 8 is defined in such a way that the balls 6 and the coupling bushes 10, 11 are not loaded by the spring force in the rest state of the adjusting device.

The play in the coupling is compensated for by the torsion spring 13 which rotates the two coupling halves or coupling bushes 10, 11 in the locking direction. This achieves a situation where manufacturing tolerances have no influence on the response behavior of the overload coupling and an exact, delay-free response of the adjusting device is ensured.

In the rest state, the force of the prestressing spring 15 is guided by the spring sleeve 14 on the end side into the spacer sleeve 8 and from the latter via the first roller bearing 22, preferably an axial ball bearing, into the cardanically shaped bearing plate 7. The force flow is finally guided via the convexly shaped bearing bush 5 into the adjusting device axle and is closed via the star-shaped driver 4 at the other end of the axle or spindle 1.

After the above-described idle travel has been overcome, the rotary movement of the lever of the disk brake at the drive element 20 (for example, a switching fork which is driven by a journal of the rotary lever) is introduced into the adjusting device.

The movement is transmitted by the drive element 20 to the drive-side coupling bush 10 which is integrally formed in one piece here.

The latter transmits the movement to the balls 12 which are mounted in each case on the drive side and output side in ramp-shaped raceways 25, 26.

As the two coupling halves 10, 11 are pre-stressed with respect to one another via the torsion spring 13, they are pressed axially apart from one another.

Here, the output-side coupling bush 11 is pressed with the integrally formed internal conical seat 23 against the external cone 24 of the spring sleeve 14, and the drive-side coupling bush 10 is pressed with the end side against the collar 21 of the spacer sleeve 8.

The frictional moment of this conical coupling is adapted in such a way that there is a self-locking action in interaction with the ball ramp geometry of the two coupling bushes.

This ensures that the rotary movement is introduced by the drive element via the two coupling bushes 10, 11, the conical seat (elements 23, 24) and the spring sleeve 14 into the threaded tube or the surrounding threaded spindles, and an adjusting operation is carried out.

Furthermore, it is ensured that, during locking of the threaded tube when the linings come into contact with the brake disk, the two coupling bushes 10, 11 can be pressed apart from one another counter to the force of the prestressing spring 15 and the overload protective function or overload coupling function is ensured.

The response moment of the overload function can be set in an accurate and simple manner via the magnitude of the prestressing spring force and the pitch angle of the ball ramp raceways 25, 26.

It is necessary for correct functioning that the response moment of the overload function has a defined magnitude. In order to protect the drive elements, it is favorable if the further rolling moment decreases after the response of the overload function. This can be implemented very simply and clearly by different pitch angles of the ball ramp raceways 24, 25.

The freewheel function which is necessary in order to compensate for the lining wear is ensured by the fact that, during reversing, the balls are moved on the ramp contour of the raceways 24, 25 so as to run down the latter and no locking of the coupling bushes 10, 11 in conjunction with the conical seat is possible.

As a result of the prestressing with the torsion spring 13, the two coupling halves 10, 11 are opened only until the force flow in the conical seat is smaller than the force of the torsion spring 13 which counteracts it.

This achieves a situation where the freewheel function is practically without play, and therefore a very direct and exact response is achieved.

A further requirement of the adjusting device is the possibility of reversing counter to the locking action of the freewheel during the lining change. This function is brought about in the following manner:

During reversing, the coupling halves 10, 11 are pressed apart until the balls 12 reach the end of the ball ramp raceway. Here, the pitch angle of the ball ramp raceways 25, 26 changes in such a way and to such an extent that there is no self-locking action of the ball ramp coupling in conjunction with the conical seat in this case.

As a result, the spring sleeve 14 rotates when the frictional moment in the conical seat is overcome, and the threaded tube therefore rotates counter to the locking direction of the freewheel.

In comparison with the prior art, this arrangement leads to some noticeable advantages.

First of all, a very small number of individual parts are required, which leads to low costs and relatively simple assembly.

In addition, the individual parts which are used are configured in such a way that they can be manufactured inexpensively, substantially by shaping without cutting. In addition, they are of entirely robust configuration and are therefore particularly functionally reliable.

As the balls 12 move on defined ball raceways 24, 25, clear functional behavior is ensured.

In addition, the adjusting device ensures a low hysteresis in the functional behavior, as all the moving parts are mounted on ball bearings.

In addition, on account of the great rolling angle of the balls 12, uncontrolled over rolling of the balls cannot occur in the overload coupling.

The constant functional behavior which can be achieved during the entire service life is also advantageous, as possible wear has scarcely no effect on the force conditions.

Finally, the great adaptability as a result of many individual parameter setting possibilities is also to be mentioned as advantageous.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An adjusting device for adjusting a friction face wear on a brake lining and a brake disk of a pneumatically actuated disk brake having a brake application device which is actuated by a rotary lever, comprising:
   a spindle;
   a spring sleeve;
   a prestressing spring;
   an adjuster driver;
   two rolling body bearing arrangements; and
   a switching fork,
   wherein
      the adjuster driver retains the prestressing spring, the spring sleeve, the two roller body bearing arrangements and the switching fork on the spindle, with the switching fork arranged axially between the two rolling body bearing arrangements,
      a first one of the rolling body bearing arrangements is configured as a roller bearing and a second one of the rolling body bearing arrangements is configured as a ball ramp coupling with a freewheeling function,
      the ball ramp coupling has a drive-side coupling bush on a switching fork side of the ball ramp coupling and an output-side coupling bush on a side of the ball ramp coupling away from the switching fork, and wedging balls between the drive-side coupling bush and the output-side coupling bush,
      the output-side coupling bush is axially supported on a conical seat of the spring sleeve, and
      the drive-side coupling and the output-side coupling bush are stressed with respect to one another by a torsion spring,
   wherein the torsion spring is arranged concentrically with respect to the drive-side coupling bush and the output-side coupling bush.

2. The adjusting device as claimed in claim 1, wherein when the adjusting device is in a rest position, the coupling bushes are maintained in an unloaded condition by a spacer sleeve.

3. The adjusting device as claimed in claim 2, wherein a length of the spacer sleeve is sufficient to prevent loading of the balls of the first rolling body bearing arrangement and the coupling bushes by the prestressing spring when the adjusting device is in the rest position.

4. The adjusting device as claimed in claim 1, wherein a predefined response force of the coupling bushes is generated by the prestressing spring.

5. The adjusting device as claimed in claim 1, wherein the prestressing spring, the spring sleeve, the rolling body bearing arrangements and the switching fork are retained on the spindle between the adjusting driver and a bearing plate of cardanic configuration.

6. The adjusting device as claimed in claim 1, wherein a frictional moment of the conical seat is selected to produce a self-locking action in interaction with the ball ramp geometry of the two coupling bushes.

7. The adjusting device as claimed in claim 1, wherein the free-wheeling function is obtained during reversing motion of the adjuster device by movement of the balls of the ball ramp coupling on ramp contours of opposing raceways of the coupling bushes to positions which preclude locking of the coupling bushes against rotation relative to one another.

8. The adjusting device as claimed in claim 7, wherein a pitch angle of the raceways and a configuration of the conical seat are selected such that during reversing, the conical seat and the ball ramp coupling cooperate to prevent self-locking of the ball ramp coupling.

* * * * *